United States Patent Office 3,101,782
Patented Aug. 27, 1963

3,101,782
REVERSE-FLOW SOLVENT FLOODING METHOD
Le Roy W. Holm, Crystal Lake, Ill., assignor to The Pure Oil Company, Chicago, Ill., a corporation of Ohio
No Drawing. Filed June 13, 1960, Ser. No. 35,399
12 Claims. (Cl. 166—9)

This invention relates to a process for producing petroleum from oil-bearing formations which have previously been produced by a water-flood. More particularly, this invention is directed to a process by which additional quantities of oil can be recovered from petroleum-bearing formations which have been produced by water-flooding until the ratio of water-to-oil at the producing wells has reached uneconomically high levels.

Processes are known for producing petroleum by the use of a water drive. According to these methods, water, or an aqueous liquid, is forced under pressure into the formation to displace oil which then is produced through one or more producing wells. It is also known to use a liquid-displacing medium which has the property of loosening the oil from the rock, or of mixing with the oil to substantially reduce its viscosity. The art teaches the addition of various surfactant agents and viscosity improvers to the floodwater. However, only a part of the oil present in the formation can be produced by these methods.

The art also teaches the injection of a slug of oil-miscible solvent ahead of the water-flood. Sometimes the formation is scrubbed by a plurality of banks of slugs of oil-miscible solvent. The oil-miscible solvent may also be soluble in the floodwater by which it is driven, in which case a single-phase displacement of the oil is said to be obtained. Oil-miscible solvents suggested by the prior art include fluids such as light liquefiable hydrocarbons, petroleum fractions in the naphtha and gas-oil ranges, and partially oxidized hydrocarbons such as alcohols, ketones, aldehydes, organic acids, and organic acid esters. In each case it has been found that the secondary-recovery process must be abandoned when large quantities of oil still remain in the reservoir, because the oil can no longer be economically produced due to the very high water-to-oil ratios at the producing wells, or because the value of the oil produced does not justify the expense of injecting further quantities of fluid into the formation.

A copending application of the instant inventor, Serial No. 831,638, filed August 4, 1959, teaches an oil-recovery process based on the discovery that by injecting a bank of oil-miscible, water-immiscible solvent into a water-flooded formation, and driving this solvent through the formation in a direction substantially opposite to that of the initial water-flood, additional quantities of oil can be recovered at unexpectedly favorable water-to-oil ratios, and with the injection of substantially smaller quantities of drive fluid than would be otherwise required. This method is especially applicable to oil-containing reservoirs which have been produced by water-flood processes of the prior art under the water-to-oil ratio of the produced fluids has reached a value of 2 to 1, or higher, and in which the pressures in the reservoir are substantially lower than 1,000 p.s.i.g., preferably about 200 p.s.i.g. The process comprises what may be described as a reverse-flow solvent flood wherein an oil-soluble, but substantially water-insoluble liquid, such as a low-molecular-weight hydrocarbon as exemplified by propane, butane, or pentane, is injected into the reservoir and driven through the reservoir in a direction substantially opposite to the direction of the original water-flood. The solvent slug is driven through the formation by the injection of an aqueous drive fluid, such as water.

Briefly, the instant invention is an improvement over the afore-described process of copending application, Serial Number 831,638, in that it provides a process by which some of the oil-miscible solvent can be replaced with a low-cost gaseous fluid with little loss in petroleum-recovery efficiency. Alternatively, a quantity of gaseous fluid may be injected in addition to the usual quantity of liquefied low-molecular-weight solvent, with the result that oil recoveries are substantially enhanced.

It is an object of this invention to provide an improved petroleum-recovery process by which additional quantities of oil can be produced from a petroleum-containing reservoir which has been produced by aqueous fluid-drive methods until the water-to-oil ratio at the producing wells has risen to an uneconomically high level. It is another object of this invention to provide an improved process by which additional quantities of oil can be recovered from oil-containing reservoirs previously produced by aqueous drive, without requiring the injection of unnecessarily large quantities of drive fluid to the reservoir. Yet another object of this invention is to provide a secondary-recovery process by which oil can be recovered from petroleum-containing reservoirs in a shorter period of time and with the injection of less expensive material than are required by processes of the prior art.

The method of this invention is especially applicable to oil-containing reservoirs which have been produced by water-flood processes of the prior art until the water-to-oil ratio in the produced fluids has reached a value of at least 2 to 1. The process comprises what may be described as a reverse-flow solvent flood wherein a slug of oil-soluble, but substantially water-insoluble, liquid is injected into the reservoir, a slug of gas is injected into the reservoir, and the injected fluids are driven through the reservoir in a direction substantially opposite to the direction of the original water-flood by the injection of an aqueous drive-fluid such as water. The injected gaseous slug need not be soluble in the oil-soluble liquid, but must be substantially insoluble in water. In order to avoid the necessity for drilling additional injection wells and producing wells, it is preferred to practice the process of this invention by converting a well bore initially used as an input well into a producing well, and a well bore initially used as an output well into an injection well. Thus the flow of fluid through the formation is exactly reversed. It is, however, possible to use other combinations of producing and/or injection wells as will result in the flow through the formation being substantially in a direction opposite to the flow during the initial water-flood operation.

The above-described processes of this invention have been found to be far superior to the prior art solvent-flood methods wherein a quantity of solvent is injected into the reservoir and driven towards producing wells in the same direction previously used in a conventional water-flood. Equivalent or increased quantities of oil are recovered much sooner after initiating the process of this invention, and with the injection of smaller quantities of fluid, solvent, gas, and water, than when using conventional processes. The process of this invention is equally effective at high or low reservoir pressure, but will probably find greater application at pressures below 1,000 p.s.i.g. because of the lack of effective processes for treating low-pressure reservoirs, and because most watered-out reservoirs are in fact at pressures in the lower range.

The solvent used in the process of this invention may be any fluid which is miscible with the petroleum to be recovered, is substantially insoluble in water, and exists in liquid phase at reservoir temperature and injection pressure. The fluid must further have a viscosity lower than that of the petroleum to be recovered, and preferably not greater than about 10% of the viscosity of the petroleum. Suitable exemplary materials include lower-boiling, liquefiable paraffin hydrocarbons, and more particularly, hydrocarbons having 3 to 7 carbon atoms, such as propane, butane, and pentane. Other hydrocarbons, such as the $C_6$ to $C_{10}$ hydrocarbons commonly found in naphtha and gas-oil fractions may also be used. The use of mixtures of various $C_3$ to $C_{10}$ hydrocarbons is contemplated.

The gaseous fluid injected after the liquid solvent need not be soluble in the liquid solvent at the conditions of injection, but should be only slightly soluble in water.

The quantity of gas injected is critical in that it must not exceed the amount which will cause gas breakthrough at a producing well before injection of water has begun. If the quantity of gas injected greatly exceeds this amount, the liquid solvent zone is by-passed by the gas and fingers through the reservoir to the producing well, and reduces the efficiency of the process.

On the other hand, by injecting too small a slug of gas, the full potentialities of the method of this invention are not realized. Accordingly, it is preferred to inject a quantity of gas slightly less than that amount which would cause gas breakthrough at a producing well. This amount depends upon the flooding pattern chosen and the permeability characteristics of the reservoir rock. It can be estimated from such information, and in general ranges between 3 to 12% of the pore volume being flooded.

The superiority of the method of this invention over the method of the afore-named, copending application has been established by comparative core experiments. The tests were conducted as a series of floods on watered-out, uniform sandstone and stratified sand cores, using propane as the liquid solvent and methane or nitrogen as the injected-gas slug. Comparable runs on the same cores using only a propane slug have been made for comparison. The results of these experiments are summarized in the accompanying tables.

TABLE I

*Propane-Slug Water Floods on Watered-Out Uniform and Stratified Cores*

[Injection conducted in reverse direction to previous water-flood]

| Propane slug (percent P.V.) | Methane slug (percent P.V.) | Water produced before oil bank (percent P.V.) | Oil produced in bank (percent P.V.) | Water-oil ratio in bank | Total oil recovered (percent P.V.) | Oil recovery efficiency, ratio of oil recovered to propane injected | Total fluid injected (P.V.) |
|---|---|---|---|---|---|---|---|
| Berea sandstone | | | | | | | |
| 4.2 | 0 | 21 | 4.3 | 1.1/1 | 9.8 | 2.34 | 1.47 |
| 7.7 | 0 | 22 | 6.3 | 1/1 | 14.6 | 1.90 | 1.48 |
| 4.2 | 4.2 | 24 | 7.5 | 1/1 | 12.7 | 3.03 | 1.35 |
| Stratified sand | | | | | | | |
| 2.7 | 0 | 11 | 3.3 | 4.1/1 | 4.6 | 1.70 | 1.1 |
| 4.5 | 0 | 10 | 4.7 | 2.2/1 | 8.6 | 1.91 | 0.9 |
| 2.7 | 2.7 | 9 | 4.4 | 2.6/1 | 7.2 | 2.65 | 0.7 |

TABLE II

*Propane-Slug, Gas Slug, Water Floods on Watered-Out, Stratified Sand Cores*

[Injection conducted in reverse direction to previous water-flood]

| Propane slug (percent P.V.) | Methane slug (percent P.V.) | Water produced before oil bank (percent P.V.) | Oil produced in bank (percent P.V.) | Water-oil ratio in bank | Total oil recovered (percent P.V.) | Oil recovery efficiency, ratio of oil recovered to propane injected | Total fluid injected (P.V.) |
|---|---|---|---|---|---|---|---|
| 4.5 | 0 | 23.0 | 4.7 | 2.1/1 | 9.5 | 2.06 | 0.9 |
| 4.5 | 4.5 | 23.8 | 5.6 | 1.9/1 | 10.6 | 2.36 | 0.9 |
| 4.5 | 9.0 | 22.7 | 6.1 | 1.5/1 | 11.4 | 2.51 | 0.9 |
| 4.5 | 12.0 | 16.1 | -- | -- | 11.0 | 2.45 | 1.2 |
| 4.5 | [1] 4.5 | 23.6 | 6.7 | 1.1/1 | 10.5 | 2.34 | 0.85 |

[1] Nitrogen used in place of methane.

Natural gas, air, methane, flue gas, or nitrogen are preferred gases. Mixtures of these gases also may be used.

All experiments on the Berea sandstone were conducted at 600 p.s.i.g. and 90° F. Those on the stratified sand were conducted at 600 p.s.i.g. and 75° F. The cores were flooded prior to solvent injection with water until the oil-to-water ratio reached a value of about 30 to 1. This is about the economic limit for most water-floods. Injection of solvent, gas, and drive water was in reverse direction to the initial water-flood. The Berea sandstone cores were 3½ inches in diameter and 8 feet long. Table I shows that the oil in place in the Berea cores after the initial water-flood and before the injection of liquid solvent amounted to 27.2 percent of the pore volume in each case, and was a full-range crude oil, 39° API. The stratified sand core had a diameter of 3 inches and a length of 6 feet. It comprised 3 layers of unconsolidated sand having permeabilities in the ratio of 1 to 2 to 8. The oil in place in this stratified sand pack after initial water-flood and before the injection of liquid solvent amounted to 29.3% P.V. in each experiment, and also was a full-range crude oil (43° API). The quantities of gas injected were equal to the volume of the propane slug measured at injection temperature and pressure.

In Table II, the oil in place in the stratified core was a refined petroleum oil having a viscosity of 4.2 cp. The amount of oil in place after the initial water-flood but before the injection of liquid solvent was 27.7% P.V. The stratified sand core had a diameter of 3 inches and a length of 6 feet, and comprised two layers of unconsolidated sand having permeabilities in the ratio of about 3 to 1.

It is evident that in those cases in which a methane or nitrogen slug was used, oil recoveries were substantially better than those obtained using a comparable propane slug but no gas slug. Since the cost of the gas (particularly air) injected is very small, it is evident that the method of this invention provides a substantial economic advantage over the process of reverse-flood propane injection.

This application is a continuation in part of prior application Serial No. 831,638, filed August 4, 1959, and now abandoned.

The embodiments of the invention in which a special property or privilege is claimed are defined as follows.

I claim:

1. In the recovery of oil from an oil-containing underground reservoir by the injection of aqueous liquid into said reservoir through an input well and the recovery of oil from said reservoir through an output well, the ratio of water to oil produced at said output well having reached a value in an excess of 2 to 1, the improvement comprising terminating the injection of said aqueous liquid through said input well, injecting into said reservoir through an injection well a slug of fluid soluble in said oil but substantially insoluble in the aqueous liquids in said reservoir, said fluid being additionally characterized as having a viscosity substantially less than that of the oil in said reservoir, then injecting into said reservoir through said injection well a slug of gas which is substantially insoluble in the aqueous liquids in said reservoir, to drive said fluid toward a producing well, discontinuing injection of said gas prior to the breakthrough thereof to a producing well, the amount of gas injected not exceeding about 0.12 reservoir pore volume, thereafter injecting water through said injection well to drive said slugs of fluid and gas towards a producing well, the direction of flow from said injection well to said producing well being substantially opposite to the direction of flow from said input well to said output well, and producing oil from said producing well.

2. A method according to claim 1 in which the liquid is a hydrocarbon having 3 to 10 carbon atoms.

3. A method according to claim 2 in which the gas is selected from the group consisting of methane, ethane, nitrogen, and air.

4. A method according to claim 3 in which the volume of said slug of liquid, measured as a liquid, is equivalent to about 0.01 to 0.1 reservoir pore volume.

5. A method according to claim 3 in which the volume of said gas injected is equivalent to about 0.03 to 0.12 reservoir pore volume, measured at injection temperature and pressure.

6. A process according to claim 5 in which the wellbore first used as said input well is subsequently used as said producing well.

7. A process according to claim 6 in which the wellbore first used as said output well is subsequenlty used as said injection well.

8. In the recovery of oil from an oil-containing underground reservoir by the injection of aqueous liquid into said reservoir through an input well and the concomitant recovery of oil from said reservoir through an output well, the ratio of water-to-oil produced at said output well having reached a value in excess of 2 to 1, the improvement comprising terminating the injection of said aqueous liquid through said input well, injecting into said reservoir through an injection well a slug of fluid soluble in said oil but substantially insoluble in the aqueous liquids in said reservoir, said fluid being additionally characterized as having a viscosity substantially less than that of the oil in said reservoir, thereafter injecting aqueous fluid through said injection well and into said reservoir to drive said slug of fluid toward a producing well, the path of fluid travel through said reservoir from said injection well to said producing well being substantially the same as the path of fluid travel from said input well to said output well, the direction of flow from said injection well to said producing well being substantially opposite to the direction of flow from said input well to said output well, and producing oil from said producing well.

9. A method according to claim 8 in which the fluid is a hydrocarbon.

10. A method according to claim 9 in which said hydrocarbon contains 3 to 7 carbon atoms.

11. A process according to claim 10 in which the wellbore first used as said input well is subsequently used as said producing well.

12. A process according to claim 11 in which the wellbore first used as said output well is subsequently used as said injection well.

References Cited in the file of this patent

UNITED STATES PATENTS

| | | |
|---|---|---|
| 2,669,307 | Mulholland et al. | Feb. 16, 1954 |
| 2,885,002 | Jenks | May 5, 1959 |
| 2,968,350 | Slobod et al. | Jan. 17, 1961 |

OTHER REFERENCES

Moses et al.: "Applications of Miscible Phase Displacement Processes," Producers Monthly, October 1959, pages 14 to 21.